Figure 1:
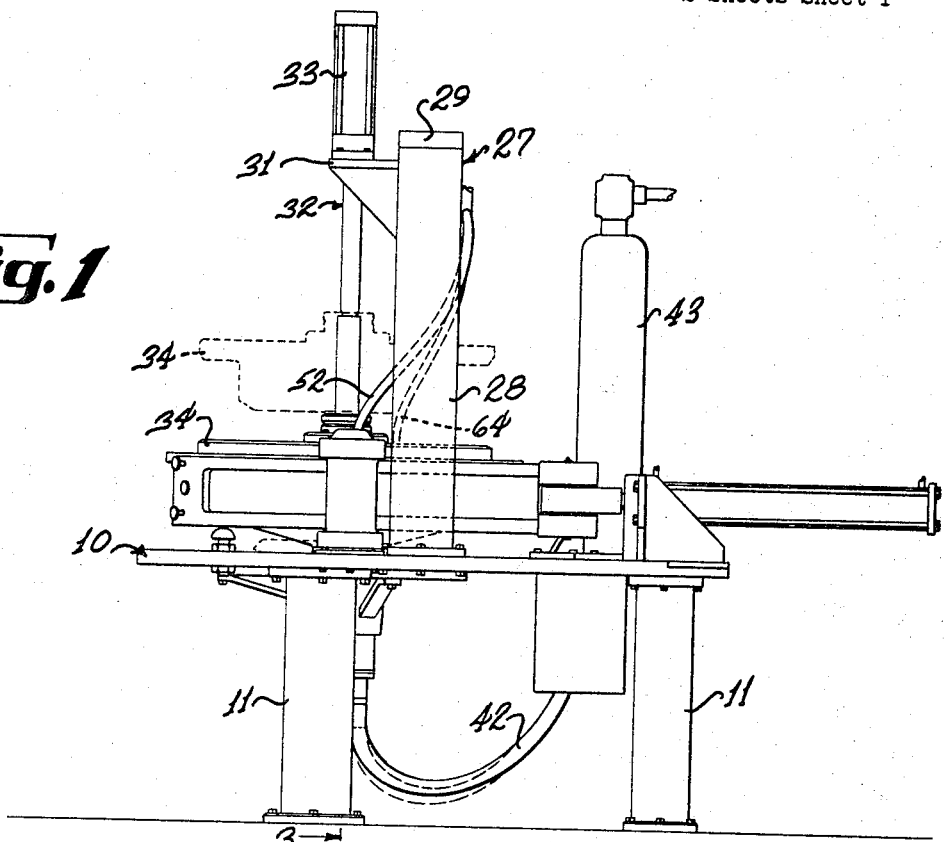

INVENTOR.
Roy C. Hathorn
BY
Attorneys

Dec. 17, 1968　　　　R. C. HATHORN　　　　3,416,593
CORE BOX ASSEMBLY WITH HEATING MEANS THEREFOR
Filed Aug. 19, 1966　　　　　　　　　　　　　　2 Sheets-Sheet 2
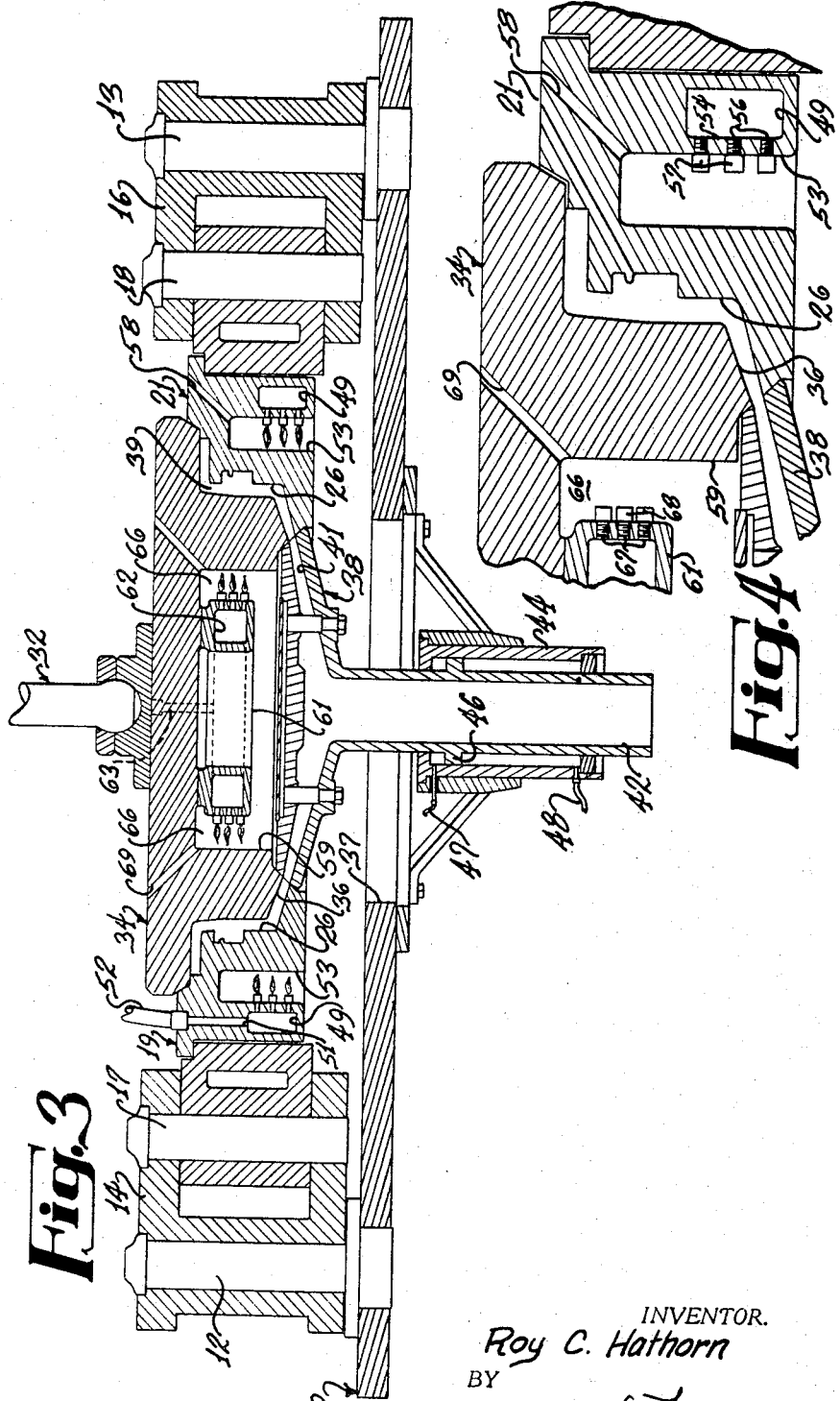
INVENTOR.
Roy C. Hathorn
BY
Jennings Carter & T Longorn
Attorneys

United States Patent Office 3,416,593
Patented Dec. 17, 1968

3,416,593
CORE BOX ASSEMBLY WITH HEATING
MEANS THEREFOR
Roy C. Hathorn, 1309 Kilby Terrace,
Anniston, Ala. 36201
Filed Aug. 19, 1966, Ser. No. 573,572
6 Claims. (Cl. 164—234)

This invention relates to a core box assembly with heating means therefor and more particularly to means for heating a core box having a pair of cooperating sections with cavities therein which cooperate with a mandrel to define a mold cavity.

An object of my invention is to provide apparatus for heating a core box assembly wherein a combustible mixture is introduced within the confines of the core box and mandrel without heating directly the outer surface of the core box and mandrel, thereby reducing to a minimum the amount of heat required to cure the product in the mold.

Another object of my invention is to provide apparatus for heating a core box assembly of the character designated which eliminates the necessity of providing outside manifolds for supplying a combustible mixture.

A more specific object of my invention is to provide apparatus for heating a core box assembly of the character designated which compensates for differentials in expansion of the components of the apparatus whereby there is less distortion of the mold and the product formed therein.

A further object of my invention is to provide apparatus in which the combustible mixture employed to heat the core box is supplied through a passageway outwardly of the combustion chamber whereby the mixture is preheated, thus increasing the efficiency of the heating means and at the same time reducing the outside temperature of the apparatus.

A still further object of my invention is to provide apparatus for heating a core box assembly in which the area surrounding the apparatus is heated a minimum amount, thus providng a cooler working area adjacent the apparatus.

Heretofore in the art to which my invention relates, it has been the general practice to heat the outer surface of the core box whereby the heat is then conducted into the mold cavity to cure the product therein. Not only does this necessitate the provision of complicated manifolds and the like for supplying the heat but a substantial amount of the heat is lost and the area surrounding the apparatus is subjected to considerable heat. To overcome these and other difficulties, I provide manifolds within the confines of the core box and the mandrel and provide combustion chambers between the manifolds and the mold cavity whereby the heat is applied adjacent the mold cavity and wholly within the confines of the apparatus.

Figure 2:
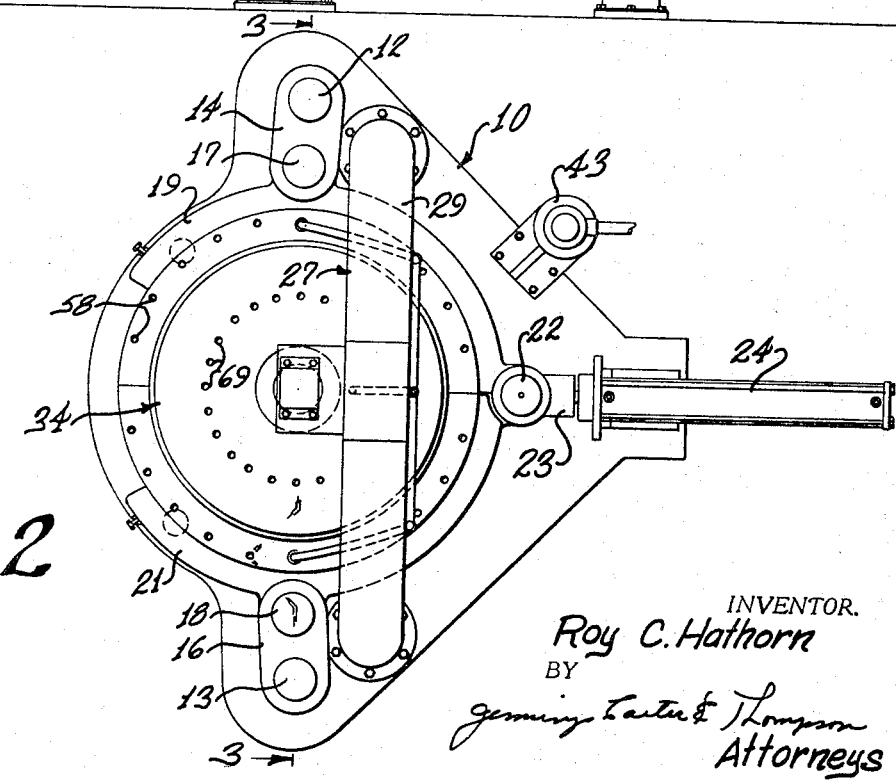

Apparatus embodying features of my invention is illustrated in the accompanying drawings, forming a part of this application, in which:

FIG. 1 is a side elevational view of the apparatus;
FIG. 2 is a top plan view of the apparatus shown in FIG. 1;
FIG. 3 is an enlarged sectional view taken generally along the line 3—3 of FIG. 2; and
FIG. 4 is an enlarged, fragmental view showing a portion of the core box and mandrel and the heating means therefor.

Referring now to the drawings for a better understanding of my invention, I show a base plate 10 supported by legs 11. Pivotally connected to opposite sides of the base plate 10 by pivot pins 12 and 13 are link members 14 and 16, respectively. The inner ends of the links 14 and 16 are pivotally connected by pivot pins 17 and 18 to semi-annular sections 19 and 21, respectively, which define a split core box.

As shown in FIG. 2, the semi-annular sections 19 and 21 of the mold box are pivotally connected to each other by a pivot pin 22. The pivot pin 22 also connects the sections 19 and 21 to one end of a piston rod 23 of a fluid pressure operated cylinder 24. Fluid under pressure is introduced selectively at opposite ends of the cylinder 24 to move the pivot pin 22 to the position shown in FIG. 2 and toward the left, as viewed in FIG. 2, whereby the semi-annular sections 19 and 21 are opened to release the product formed in the apparatus. That is, the sections 19 and 21 being connected to the toggle links 14 and 16 move outwardly away from each other as the pivot pin 22 is moved toward the left, as viewed in FIG. 2. The semi-annular sections 19 and 21 are each provided with semi-annular mold cavities 26 therein, as shown in FIGS. 3 and 4.

Mounted on the base plate 10 is an inverted U-shaped frame 27 having depending legs 28 and an upper transverse member 29. A support bracket 31 is carried by the transverse member 29 in position to support a vertical ram 32 which is actuated by a fluid pressure operated cylinder 33. A mandrel 34 is carried by the lower end of the ram 32 and is of a shape to enter the core box with the outer surface of the mandrel being in spaced relation to the cavity 26, as shown in FIGS. 3 and 4. Also, the lower end of the mandrel 34 is beveled whereby it slopes downwardly and inwardly as at 36 to facilitate entry of the mandrel into the core box. The base plate 10 is provided with a centrally disposed opening 37 for receiving a blow plate assembly 38 which is adapted to engage the undersurface of the mandrel 34 and the adjacent portion of the core box sections 19 and 21 to define a chamber 39 for receivng a moldable material, such as a resin coated sand. The blow plate assembly 38 is provided with a sand delivery passageway 41 which communicates with the chamber 39, as shown. The lower end of the sand delivery passageway 41 communicates with a sand delivery conduit 42 that in turn communicates with a sand chamber 43. The blow plate assembly 38 is moved toward and away from the mandrel 34 and the adjacent portion of the core box by a fluid pressure operated cylinder 44 which encases a piston 46 mounted on the sand delivery conduit 42, as shown in FIG. 3. Fluid under pressure is introduced into adjacent ends of the cylinder 44 by suitable conduits 47 and 48.

A semi-annular passageway 49 is provided in each of the core box sections 19 and 21 which move into alignment with each other when the sections are moved to the closed position, as shown in FIG. 2, to define an annular passageway for receiving a combustible mixture. The combustible mixture is supplied to each of the passageways 49 by an inlet passageway 51 in the sections 19 and 21, as shown in FIG. 3. The inlet passageway 51 communicates with a supply conduit 52. As shown in FIGS. 3 and 4, the passageway 49 extends around the cavity 26 and is spaced therefrom. A combustion chamber 53 is provided within the semi-annular sections 19 and 21 between the mold cavity 26 and the passageway 49. The combustion chambers 53 in the sections 19 and 21 are also in alignment with each other whereby an annular combustion chamber is provided in the core box. A partition 54 is provided between the passageways 49 and the combustion chambers 53, as clearly shown in FIG. 4. A plurality of threaded openings 56 are provided in the partition 54 for receiving external threads on burner tips 57 whereby the combustible mixture is supplied within the combustion chamber 53. Suitable vent openings 58 are provided in the sections 19 and 21 to communicate the combustion chamber 53 with the atmosphere whereby products of combustion are exhausted from the core box.

A centrally disposed recess 59 is provided in the undersurface of the mandrel 34 for receiving an annular manifold 61 having an annular passageway 62 therein for receiving a combustible mixture. The combustible mixture is supplied to the annular passageway 62 by an inlet passageway 63 which in turn communicates with a supply conduit 64. The annular manifold 61 is spaced from the inner surface of recess 59, as shown in FIGS. 3 and 4, to define a combustion chamber 66 therebetween. A plurality of threaded openings 67 are provided in the outer wall of the manifold 61 for receiving threaded ends of burner tips 68 which in turn supply the combustible mixture to the combustion chamber 66. Vent passageways 69 are provided in the mandrel 34 in position to communicate the combustion chamber 66 with the atmosphere to thus exhaust products of combustion.

From the foregoing description, the operation of my improved core box and means for heating the same will be readily understood. The semi-annular sections 19 and 21 of the core box are moved inwardly into engagement with each other, as shown in FIG. 2, and the mandrel 34 is lowered to the position shown in FIG. 3. The blow plate assembly 38 is raised into position by introducing fluid under pressure to conduit 48. With the apparatus thus assembled, the moldable material, such as resin sand, is introduced into the chamber 39 through conduit 42 and the delivery passageway 41. The sand resin mixture thus introduced into the chamber 39 is cured by the heat from combustion chambers 53 and 66.

From the foregoing it will be seen that I have devised improved means for heating a core box assembly. By providing a combustion chamber wholly within the confines of the core box and mandrel, the area surrounding the apparatus is not heated. Also, by supplying the combustible mixture to chambers located outwardly of the combustion chamber in the core box and inwardly of the combustion chamber in the mandrel, the combustible mixture is preheated to thus provide for efficient operation of the apparatus. Furthermore, by providing chambers wholly within the confines of the core box and mandrel, the areas adjacent the mold cavity are heated uniformly whereby there is less distortion of the apparatus.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:
1. In a core box assembly with heating means therefor:
   (a) a core box having a mold cavity therein,
   (b) a mandrel adapted to enter said core box with the outer surface of said mandrel in spaced relation to said mold cavity,
   (c) means to introduce a moldable material into the core box between said mandrel and said mold cavity,
   (d) there being a passageway within said core box extending around and in spaced relation to said mold cavity,
   (e) means to supply a combustible mixture to said passageway in the core box,
   (f) a combustion chamber within said core box between said mold cavity and said passageway in the core box,
   (g) means communicating said passageway in the core box with said combustion chamber therein to supply the combustible mixture to said combustion chamber,
   (h) there being a passageway within said mandrel in spaced relation to said outer surface thereof,
   (i) means to supply a combustible mixture to said passageway in the mandrel,
   (j) a combustion chamber within said mandrel between said passageway therein and the outer surface thereof,
   (k) means communicating said passageway in the mandrel with the combustion chamber therein to supply said combustible mixture, and
   (l) means venting the products of combustion from the combustion chamber in said core box and the combustion chamber in said mandrel.

2. In a core box assembly with heating means therefor as defined in claim 1 in which the core box is generally annular and said passageway and combustion chamber therein are generally annular.

3. In a core box assembly with heating means therefor as defined in claim 2 in which the annular core box comprises a pair of cooperating semi-annular sections having semi-annular passageways therein which cooperate with each other to define said annular passageway and combustion chamber.

4. In a core box assembly with heating means therefor as defined in claim 1 in which the means communicating said passageways in the core box and the passageways in the mandrel with their combustion chambers comprises a plurality of burner tips.

5. In a core box assembly with heating means therefor as defined in claim 1 in which the passageway and combustion chamber in the mandrel are generally annular.

6. In a core box assembly with heating means therefor as defined in claim 1 in which the means venting the product of combustion from the combustion chambers comprises vent passageways through said core box and mandrel which communicate the combustion chambers with the atmosphere.

References Cited

UNITED STATES PATENTS

| | | | |
|---|---|---|---|
| 2,901,792 | 9/1959 | Covitt | 164—233 |
| 3,066,363 | 12/1962 | Jay | 164—234 |
| 3,078,527 | 2/1963 | Valyi et al. | 164—228 |
| 3,273,211 | 9/1966 | Miraldi | 164—53 |

WILLIAM J. STEPHENSON, *Primary Examiner.*

EUGENE MAR, *Assistant Examiner.*

U.S. Cl. X.R.

164—233, 53; 249—61